(12) United States Patent
Ramanujam et al.

(10) Patent No.: US 7,340,185 B1
(45) Date of Patent: Mar. 4, 2008

(54) OPTICAL SIGNAL RECEIVER WITH DUAL STAGE SOFT DETECTION

(75) Inventors: Nandakumar Ramanujam, Columbia, MD (US); Andrej B. Puc, Allen, TX (US)

(73) Assignee: Tyco Telecommunications (US) Inc., Morristown, NJ (US)

(*) Notice: Subject to any disclaimer, the term of this patent is extended or adjusted under 35 U.S.C. 154(b) by 564 days.

(21) Appl. No.: 10/127,741

(22) Filed: Apr. 22, 2002

(51) Int. Cl.
*H04B 10/06* (2006.01)
(52) U.S. Cl. .................. 398/202; 398/207; 398/209
(58) Field of Classification Search ........ 398/202–213, 398/214; 385/88
See application file for complete search history.

(56) References Cited

U.S. PATENT DOCUMENTS

| | | | | |
|---|---|---|---|---|
| 4,485,347 A | * | 11/1984 | Hirasawa et al. | 329/303 |
| 5,371,625 A | * | 12/1994 | Wedding et al. | 398/141 |
| 5,581,388 A | * | 12/1996 | Gambini et al. | 398/54 |
| 6,433,904 B1 | * | 8/2002 | Swanson et al. | 398/91 |
| 6,496,547 B1 | * | 12/2002 | Powell et al. | 375/316 |
| 6,615,386 B2 | * | 9/2003 | Yano et al. | 714/780 |
| 7,209,671 B1 | * | 4/2007 | Hayee et al. | 398/207 |
| 2002/0122504 A1 | * | 9/2002 | Payne et al. | 375/317 |
| 2003/0170022 A1 | * | 9/2003 | Josef Moeller | 398/27 |

\* cited by examiner

*Primary Examiner*—Dzung Tran
(74) *Attorney, Agent, or Firm*—Grossman, Tucker, Perreault & Pfleger, PLLC

(57) ABSTRACT

An optical receiver including a plurality of time delay elements and threshold decision elements configured to receive a signal representative of an optical signal. Each of the time delay elements is configured to impart an associated time delay to the signal. Each of the threshold decision elements is configured to compare the signal to a plurality of threshold levels. Each decision element outputs a signal indicative of a probability that a particular pulse of the received signal is a binary one at its associated sampling time. An optical communication system and a method of detecting a received data signal in an optical communication system are also provided.

14 Claims, 2 Drawing Sheets

OPTICAL SIGNAL RECEIVER WITH DUAL STAGE SOFT DETECTION

CROSS REFERENCE TO RELATED APPLICATION

The present application is related to commonly assigned application Ser. No. 10/127,739, filed Apr. 22, 2002, the teachings of which are incorporated herein by reference.

FIELD OF THE INVENTION

The present invention relates to communication networks, and more particularly to a method and apparatus for enhancing detection of a signal in an optical communication network.

BACKGROUND OF THE INVENTION

Reliable optical communication systems require mechanisms for minimizing the effects of signal degradation occurring between associated transmitters and receivers. Signal degradation occurs due to a variety of factors that cannot be completely eliminated, and is exacerbated by the long-haul transmission distances and high optical channel counts required in many applications. Due to signal degradation, some transmitted data may be incorrectly interpreted at a receiver. If data is misinterpreted at a rate above that which is acceptable, the efficacy and viability of the system may be lost.

A variety of techniques for minimizing the effects of signal degradation have been investigated. Forward Error Correction (FEC) is one technique used to help compensate for signal degradation and provide "margin improvements" to the system. Margin improvements generally allow an increase in amplifier spacing and/or increase in system capacity. In a Wavelength Division Multiplexing (WDM) system, for example, margin improvements obtained through FEC techniques allow an increase in the bit rate of each WDM channel and/or a decrease the spacing between WDM channels. This translates directly into an increased system data capacity.

FEC typically involves insertion of a suitable error correction code into a transmitted data stream to facilitate detection and correction of data errors about which there is no previously known information. Error correction codes are generated in an FEC encoder for the data stream, and are sent to a receiver including an FEC decoder. The FEC decoder recovers the error correction codes and uses them to correct any errors in the received data stream.

There are a large number of error-correction codes, each with different properties that relate to how the codes are generated and consequently how they perform. Some examples of these are the linear and cyclic Hamming codes, the cyclic Bose-Chaudhuri-Hocquenghem (BCH) codes, the convolutional (Viterbi) codes, the cyclic Golay and Fire codes, Reed-Solomon (RS) codes, and some newer codes such as the Turbo convolutional and product codes (TCC, TPC).

Of course, the efficacy of FEC techniques is impacted by the ability of the optical signal receiver to correctly detect transmitted data and error correction codes. Improvements in receiver signal detection thus translate to improved performance of FEC codes in providing correction of bit errors. Accordingly, there is a need for an optical receiver configuration that provides accurate and reliable detection of the received data signal to provide improved error correction results.

BRIEF SUMMARY OF THE INVENTION

An optical signal receiver consistent with the invention includes a first stage including a plurality of time delay elements and a second stage including a plurality of threshold decision elements. The time delay elements each receive a signal representative of the optical signal and output an associated time delay signal. Each of the threshold decision elements is configured to receive an associated one of the time delay signals and provide a plurality of outputs, each of the outputs being in response to a comparison of the associated time delay signal with an associated decision threshold. An optical communication system consistent with the invention includes a transmitter and a receiver consistent with the invention.

A method of detecting a transmitted signal in an optical communication system consistent with the invention includes: splitting the signal onto a plurality of paths; imparting an associated time delay to the signal on each of the paths to provide a plurality of time delayed signals; comparing each of the time delayed signals to a plurality of threshold levels; and providing a plurality of output signals associated with each time delayed signal, each of the plurality of output signals being in response to a comparison of an associated one of the time delay signals with an associated threshold level.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
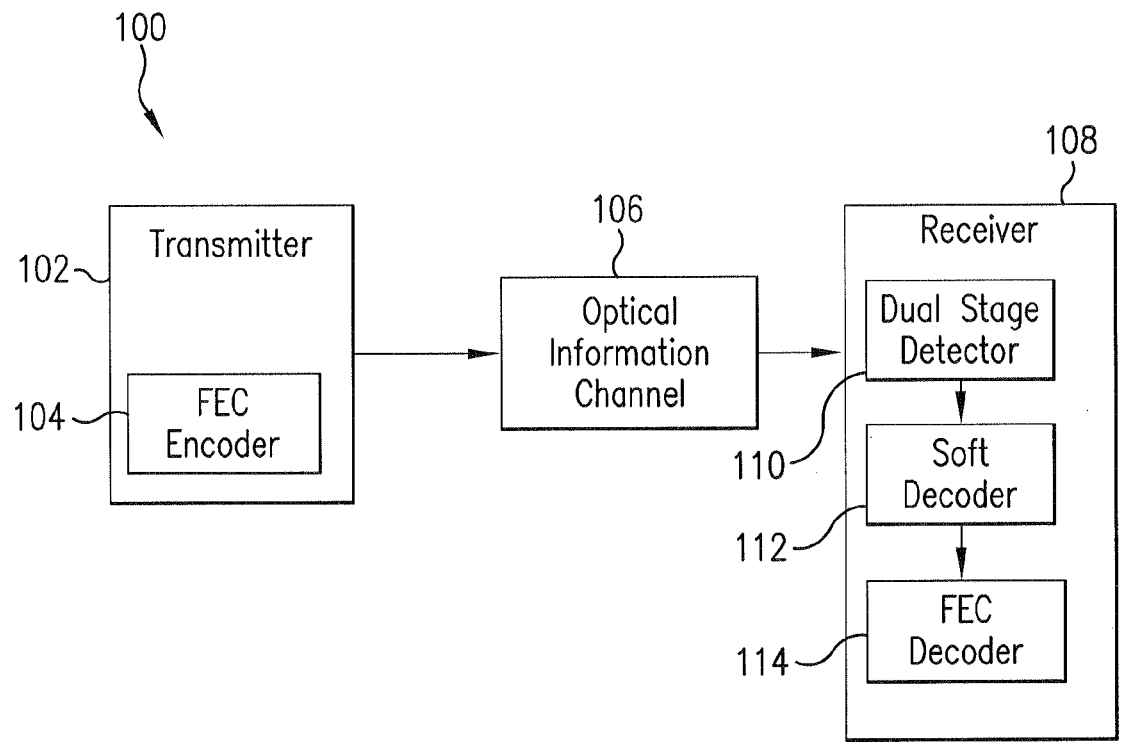
FIG. 1 is a block diagram of an exemplary optical communication system consistent with the present invention.

Turning to FIG. 1, there is illustrated an exemplary optical communication system 100 consistent with the invention. Those skilled in the art will recognize that the system 100 has been depicted as a highly simplified point-to-point system for ease of explanation. The optical communication system 100 includes a transmitter 102 and a receiver 108 connected via an optical information channel 106. The transmitter includes an FEC encoder 104, and the receiver includes a dual stage detector 110, a soft decoder 112, and an FEC decoder 114. At the transmitter, data may be modulated on an optical wavelength and encoded with an FEC code for transmission over the optical information channel 106. The optical information channel 106 may include an optical fiber waveguide, optical amplifiers, optical filters, dispersion compensating modules, and other active and passive components. As the encoded optical signal travels along the optical information channel 106 distortions including noise, pulse spreading, and timing jitter may be introduced.

Figure 2:
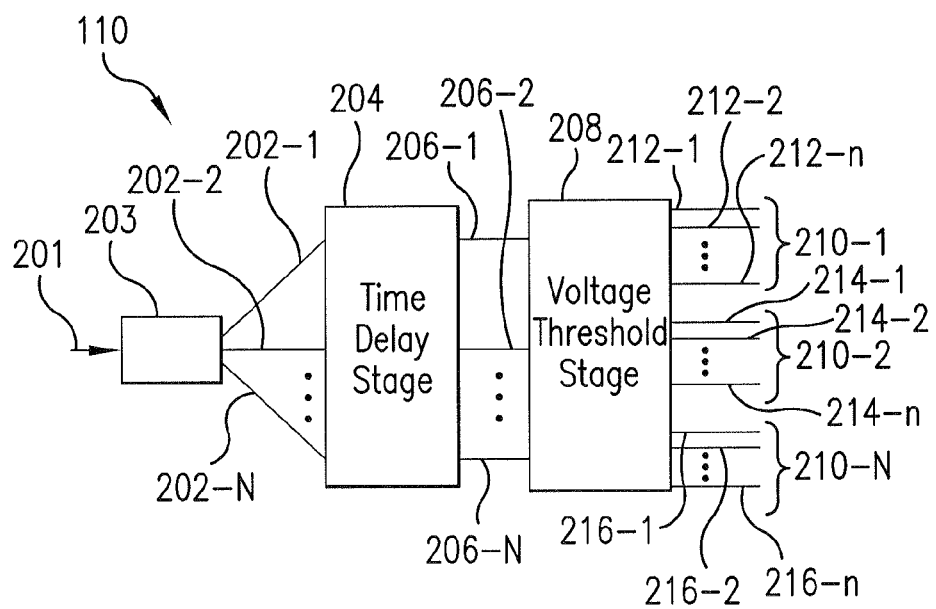
FIG. 2 is a block diagram of a dual stage detector portion of an exemplary receiver consistent with the invention.

Advantageously, an exemplary receiver consistent with the present invention performs dual stage detection of the transmitted signal by imparting different time delays to the received signal during a first stage, and comparing the time shifted signals to a plurality of decision threshold levels during a second stage. An exemplary dual stage detector 110 for performing this function is illustrated in block diagram form in FIG. 2. In general, the received data signal 201 is separated onto separate paths 202-1, 202-2, . . . 202-N by a splitter 203. A time delay stage 204 of the detector 110 imparts an associated time delay to the signal on each path and provides a delayed output 206-1, 206-2, . . . 206-N corresponding to each input to a decision threshold stage 208.

The decision threshold stage 208 performs a comparison of each of the outputs 206-1, 206-2, . . . 206-N of the time delay stage with a plurality of associated voltage threshold levels. The comparison of each delayed signal with each threshold level produces a digital output associated with each threshold. For example, if the delayed signal is less than an associated threshold, a logic "0" is provided at the output, otherwise a logic "1" is provided.

Thus, for each output 206-1, 206-2, . . . 206-N of the time delay stage, a group of digital outputs, i.e., 210-1, 210-2, and 210-N, respectively, are provided. Each group 210-1, 210-2, and 210-N of outputs includes outputs, e.g., 212-1, 212-2, 212-n, 214-1, 214-2, 214-n, 216-1, 216-2, 214-n, respectively, in response to comparison of the delay signal associated with the group with a separate voltage threshold. In this manner, the value, i.e., logic "1" or "0", of each bit in the received data signal is represented by the group of outputs corresponding to the delayed signals. By providing these groups of outputs as "soft" inputs to soft demodulator circuit, as described in greater detail below, the value of each bit is in the received data signal is accurately and reliably determined.

Figure 3:
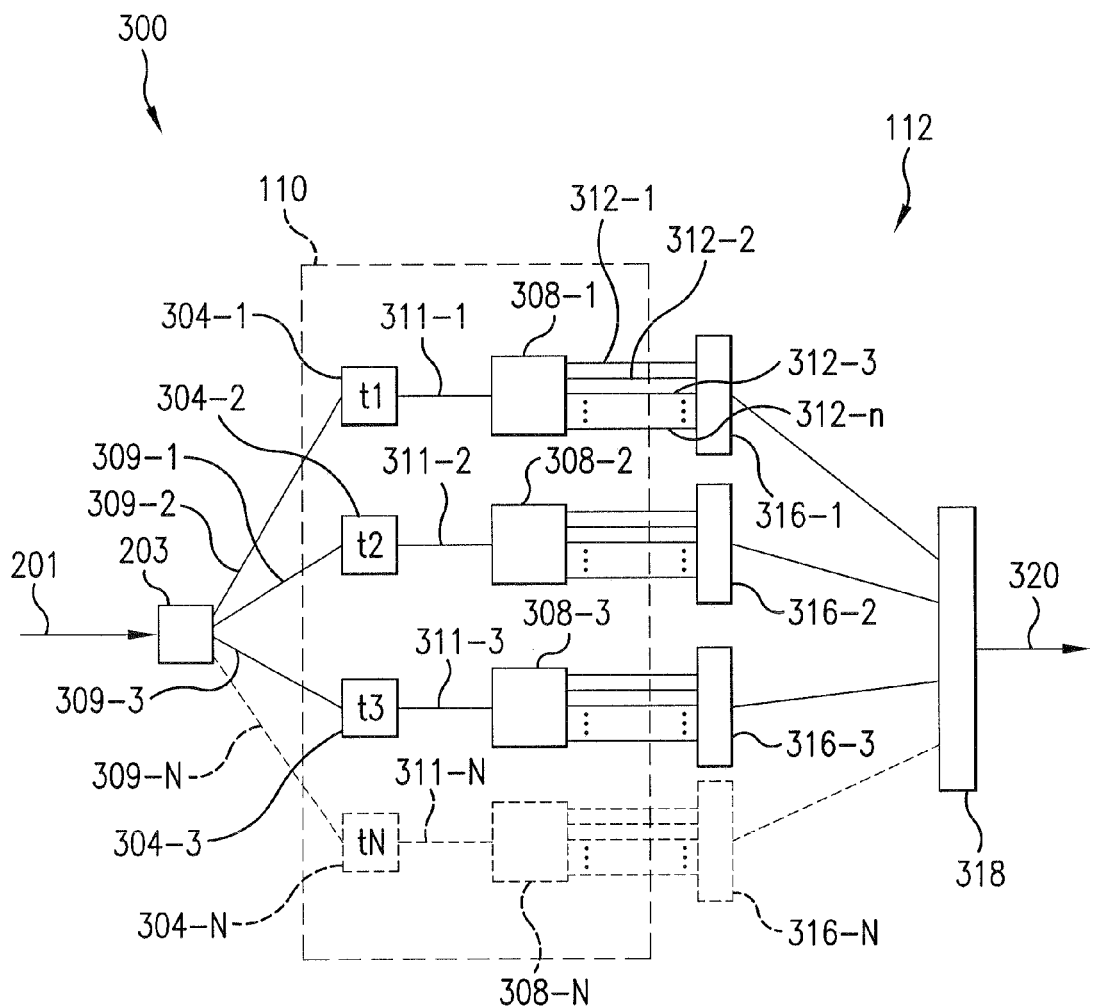
FIG. 3 is a block diagram of an exemplary optical signal receiver consistent with the present invention.

Turning to FIG. 3, an exemplary embodiment of a receiver 300 consistent with the invention is illustrated in block diagram form. Those skilled in the art will recognize that the functions performed by each of the illustrated blocks can be embodied in a variety of practical configurations. In fact, a receiver consistent with the invention may be constructed from known optical and/or electrical components. In addition, it would be possible to reverse the first and second stages of the detector.

As shown, a data signal 201 is received and is split onto a plurality of paths by a splitter 203. A variety of splitter configurations will be known to those skilled in the art. For example, the splitter may be an optical splitter if dual stage detection is performed optically. Alternatively, the splitter 203 may include an optical-to-electrical converter such as a photo-detector and then an electrical splitting circuit. The split signal is provided on separate paths 309-1, 309-2, 309-3, . . . 309-N as inputs to a first detection stage including a plurality of time delay elements 304-1, 304-2, 304-3, . . . 304-N. A variety of time delay element configurations will be known to those skilled in the art. For example, the time delay elements may be optical phase shifters in an optical system or delay circuits, e.g., parallel-connected capacitors, in an electrical system.

The time delay elements 304-1, 304-2, 304-3, . . . 304-N impart an associated time delay to each of the splitter outputs 309-1, 309-2, 309-3, . . . 309-N such that the received signal 201 can be evaluated at the different delay/sample times $t_1$, $t_2$, $t_3$, and $t_N$ for the respective time delay elements 304-1, 304-2, 304-3, . . . 304-N. In the exemplary embodiment 300, a second delay time $t_2$ for the second time delay element 304-2 may be set to result in an optimal bit error rate (BER) for the received signal, which is typically somewhat near the center of the received signal's eye diagram. A first delay time $t_1$ for the first time delay element 304-1 may be set to occur before the second delay time $t_2$, and yet a third delay time $t_3$ may be set to occur after the second delay time $t_2$. Setting the difference between the first $t_1$ and second $t_2$ delay times, and the second $t_2$ and third $t_3$ delay times, depends on the particulars of the communication system, including the amount of signal degradation in the system as measured by the extent of eye diagram closure.

The second detection stage comprises a plurality of amplitude threshold decision elements 308-1, 308-2, 308-3, . . . 308-N. Those skilled in the art will recognize a large variety of configurations for comparator circuits where the amplitude comparator function is accomplished electrically, and a large variety of various optical devices where this function is accomplished optically. The amplitude threshold decision elements 308-1, 308-2, 308-3, . . . 308-N receive a corresponding output 311-1, 311-2, 311-3, . . . 311-N from corresponding time delay elements 304-1, 304-2, 304-3, . . . 304-N, and compare the delayed signal from the time delay elements to a plurality of threshold levels.

Each threshold decision element 308-1, 308-2, 308-3, . . . 308-N provides a plurality of outputs, each of which is provided in response to a comparison of one of the threshold levels to the associated delayed signal from one of the time delay elements. In FIG. 3, for example, a plurality of outputs 312-1, 312-2, 312-3, . . . 312-n are illustrated for the first comparator 308-1. In one embodiment, each threshold decision element may have three threshold levels set at values above, equal to, and below an optimal threshold level for decoding signals at respective delay/sampling times $t_1$, $t_2$, $t_3$, or $t_N$. Similar to setting the sampling times, setting the threshold levels will depend on the characteristics of the communication system including the amount of signal distortion present.

If a received signal pulse at the first sampling time $t_1$ is above a respective threshold level, a logic "1" would be output. If a received signal pulse at the first sampling time $t_1$ is below a respective threshold level, a logic "0" will be output. Hence, each threshold decision element 308-1, 308-2, 308-3, . . . 308-N may output a binary number comprised of n binary digits, wherein the number n corresponds to the number of threshold levels chosen. Each digit corresponds to a value of the pulse compared to one of the different threshold levels for a respective sampling time $t_1$, $t_2$, $t_3$ . . . $t_N$.

A plurality of first soft decoders 316-1, 316-2, 316-3, . . . 316-N having multiple input paths may each receive an n-digit binary number output from one of the threshold decision elements 308-1, 308-2, 308-3, . . . 308-n. Each binary number output is representative of the probability that a particular bit is a logic "1" or logic "0" at the particular delay/sampling time $t_1$, $t_2$, $t_3$, $t_N$. In an exemplary embodiment, each soft decoder 316-1, 316-2, 316-3, . . . 316-N receives a three-digit binary number, wherein each digit corresponds to a comparison in an associated threshold decision element of a delayed signal with a different one of three threshold levels.

The output of each of the first soft decoders may be a digital output having a value depending on the binary input thereto. For example, if each digit of a binary number input to a soft decoder is a logic "0" then the output would be a logic "0". If, for example, two or more of the digits are a logic "1", then the soft decoder may output a logic "1." A variety of soft decoder configurations are known to those skilled in the art. In general, the input to each soft decoder represents the probability that the time delay signal is a logic "1" or zero at the sample time, and the output the soft decoder is a logic "1" or "0" depending on the probability.

Consistent with the invention, soft decoders may be cascaded until a single digital output representing the received data signal is provided. In the illustrated embodiment, for example, a second soft decoder 318 may receive the respective output signals from the first soft decoders 308-1, 308-2, 308-3, . . . 308-N and output a final digital signal 320 which accurately represents the received data signal 201. It is to be understood, however, that the present invention is not limited to the illustrated arrangement of soft decoders. In fact, those skilled in the art will recognize that soft decoders may be arranged in a variety of combinations to provide an output data signal in response to the binary number outputs of the threshold decision elements.

Also, an optical signal receiver with dual stage soft detection consistent with the invention may be used for receiving any optical signal having transitions between logic "1" and logic "0" levels. Demodulation and decoding of the signal may be performed based on the output 320. Although the present invention is not limited to systems including FEC coding, it may be advantageously applied to such systems. In operation, for example, a stream of information bits may be encoded with an FEC code at the transmitter 102 resulting in a stream of coded bits. The stream of coded bits may be transmitted over the optical information channel 106 and may be corrupted by noise and/or timing jitter. Noise may be introduced by any number of intervening passive devices or other factors including amplified spontaneous emission, nonlinearity-induced affects, and channel cross talk. Similarly, timing jitter may be introduced. Both effects lessen the probability that an FEC decoder will be able to effectively correct bit error, which may lead to an unacceptable BER for a given communication system.

To improve the efficacy of an FEC decoder, and hence the probability that the received signals will be decoded correctly despite noise and timing jitter, consistent with the present invention a received signal may be delivered to a first stage that imparts a plurality of time delays to the received signal. In turn, a second stage compares the received signal to a plurality of threshold levels at various delay times $t_1$, $t_2$, $t_3$, and $t_N$ outputting a binary one if the signal is above a threshold level and a binary zero if the signal is below a threshold level. In effect, the first stage provides error correction due to noise, and the second demodulating stage provides for error correction due to distortions such as timing jitter.

At the output of each threshold decision elements, each pulse in the received signal is represented by a n-digit binary number indicative of the probability that the pulse is a logic "1" or "0" at the time delay associated with the threshold decision element. These n-digit binary numbers are provided as inputs to associated ones of a first set of soft decoders 316-1, 316-2, 316-3, . . . 316-N. The binary numbers are indicative of the probability that a particular pulse at a particular sample time is a logic "0" or logic "1." In a similar fashion the outputs from the first plurality of soft decoders may be successive soft decoder stages, e.g., soft decoder 318, that further provide a final detected signal that is an accurate reconstruction of the input data signal.

The embodiments that have been described herein, however, are but some of the several which utilize this invention and are set forth here by way of illustration but not of limitation. Many other embodiments, which will be readily apparent to those skilled in the art, may be made without departing materially from the spirit and scope of the invention.

What is claimed is:

1. An optical signal receiver comprising:
    a plurality of time delay elements each configured to receive a signal representative of an optical signal and output an associated time delay signal; and
    a plurality of threshold decision elements, each of said threshold decision elements configured to receive an associated one of said time delay signals and compare a single bit of said optical signal with a plurality of different decision threshold levels to provide a plurality of digital outputs, each of said plurality of digital outputs being associated with a comparison of said single bit with a different one of said decision threshold levels, said plurality of digital outputs for each of said threshold decision elements thereby being collectively indicative of a probability that said single bit has a particular binary value.

2. The receiver of claim 1, wherein each of said threshold decision elements provides three of said digital outputs.

3. The receiver of claim 1, wherein each said plurality of digital outputs is coupled to an associated soft decoder configured to provide an associated binary output in response to said plurality of digital outputs.

4. The receiver of claim 3, wherein each said binary output is coupled to a second soft decoder for providing an output signal in response to said binary outputs.

5. The receiver of claim 1, said receiver further comprising a splitter for receiving said optical signal and providing said signal representative of said optical signal to each of said time delay elements.

6. The optical communication system of claim 1, wherein each of said threshold decision elements provides three of said digital outputs.

7. An optical communication system comprising:
    a transmitter for transmitting an optical signal on an optical information channel; and
    a receiver, said receiver comprising:
        a plurality of time delay elements each configured to receive a signal representative of said optical signal and output an associated time delay signal; and
        a plurality of threshold decision elements, each of said threshold decision elements configured to receive an associated one of said time delay signals and compare a single bit of said optical signal with a plurality of different decision threshold levels to provide a plurality of digital outputs, each of said plurality of digital outputs being associated with a comparison of said single bit with a different one of said decision threshold levels, said plurality of digital outputs for each of said threshold decision elements thereby being collectively indicative of a probability that said single bit has a particular binary value.

8. The optical communication system of claim 7, wherein each said plurality of digital outputs is coupled to an associated soft decoder configured to provide an associated binary output in response to said plurality of digital outputs.

9. The optical communication system of claim 8, wherein each said binary output is coupled to a second soft decoder for providing an output signal in response to said binary outputs.

10. The optical communication system of claim 7, wherein said receiver further comprises a splitter for receiving said optical signal and providing said signal representative of said optical signal to each of said time delay elements.

11. A method of detecting a transmitted signal in an optical communication system, said method comprising:

splitting said signal onto a plurality of paths;

imparting an associated time delay to said signal on each of said paths to provide a plurality of time delayed signals;

comparing each of said time delayed signals to a plurality of different threshold levels to provide a plurality of digital outputs associated with each of said time delayed signals, each of said plurality of digital outputs being associated with a comparison of a single bit of said signal with a different one of said decision threshold levels, said plurality of digital outputs for each of said time delay signals thereby being collectively indicative of a probability that said single bit has a particular binary value.

12. A method according to claim 11, wherein said plurality of threshold levels comprises three threshold levels.

13. A method according to claim 11, said method further comprising coupling each of said plurality of digital outputs to an associated soft decoder configured to provide an associated binary output in response to said plurality of digital outputs.

14. A method according to claim 13, said method further comprising coupling each said binary output to a second soft decoder for providing an output signal in response to said binary outputs.

* * * * *